(12) United States Patent
He et al.

(10) Patent No.: US 6,927,661 B2
(45) Date of Patent: Aug. 9, 2005

(54) PLANAR TRANSFORMER AND OUTPUT INDUCTOR STRUCTURE WITH SINGLE PLANAR WINDING BOARD AND TWO MAGNETIC CORES

(75) Inventors: Jin He, Plano, TX (US); Michael Duane Lawrence, Rowlett, TX (US); Gordon K. Y. Lee, Plano, TX (US); Victor Ke-Ji Lee, Plano, TX (US); Donald Bruce Rose, Rockwall, TX (US)

(73) Assignee: TDK Innoveta Inc., Richardson, TX (US)

( * ) Notice: Subject to any disclaimer, the term of this patent is extended or adjusted under 35 U.S.C. 154(b) by 0 days.

(21) Appl. No.: 10/428,963

(22) Filed: May 2, 2003

(65) Prior Publication Data

US 2004/0174241 A1 Sep. 9, 2004

Related U.S. Application Data

(60) Provisional application No. 60/452,285, filed on Mar. 5, 2003.

(51) Int. Cl.[7] ................................................. H01F 5/00
(52) U.S. Cl. ....................... 336/200; 336/223; 336/232; 29/602.1
(58) Field of Search ................................ 336/200, 223, 336/232; 29/602.1, 605, 606

(56) References Cited

U.S. PATENT DOCUMENTS

| | | | | |
|---|---|---|---|---|
| 4,689,592 A | | 8/1987 | Walker | |
| 5,532,667 A | * | 7/1996 | Haertling et al. | 336/177 |
| 5,541,567 A | * | 7/1996 | Fogel et al. | 336/200 |
| 5,565,837 A | * | 10/1996 | Godek et al. | 336/232 |
| 5,631,822 A | * | 5/1997 | Silberkleit et al. | 363/144 |
| 5,835,350 A | * | 11/1998 | Stevens | 361/704 |
| 5,990,776 A | * | 11/1999 | Jitaru | 336/200 |
| 6,128,817 A | | 10/2000 | Roessler et al. | |

OTHER PUBLICATIONS

Meinhardt, Mike, et al. "New Method for Integration of Resonant Inductor and Transformer–Design, Realization, Measurements." PEI Technologies, National Microelectronics Reseach Centre. 1999. Cork, Ireland.

* cited by examiner

*Primary Examiner*—Anh Mai
(74) *Attorney, Agent, or Firm*—David W. Carstens; Carstens & Cahoon, LLP

(57) ABSTRACT

The magnetic device consists of a planar winding board, which contains the windings for both the inductor and the transformer. Thus, this invention centers on integrating the windings of multiple magnetic devices, not integrating the cores. By connecting the transformer secondary winding directly to the output inductor winding without using any intermediate headers and/or termination pins or conductive copper traces, both electrical path and the termination resistance will be minimized. Furthermore, the number of headers or termination pins required will also be reduced, which helps to not only alleviate the issue associated with co-planarity of the termination pins, but also reduce the cost of the material and manufacturing.

20 Claims, 4 Drawing Sheets

PLANAR TRANSFORMER AND OUTPUT INDUCTOR STRUCTURE WITH SINGLE PLANAR WINDING BOARD AND TWO MAGNETIC CORES

CROSS REFERENCE TO RELATED APPLICATION

The present non-provisional application claims priority to provisional application, Ser. No. 60/452,285 filed on Mar. 5, 2003, and also entitled "Planar Transformer and Output Inductor Structure with Single Planar Winding Board and Two Magnetic Cores."

BACKGROUND OF THE INVENTION

1. Technical Field

The present invention is directed to a planar transformer and output inductor structure with a single planar winding board and two magnetic cores. This miniaturized component is used in power supplies and specifically in DC-to-DC converters.

2. Description of Related Art

To meet ever-increasing demand for high speed and miniaturization of digital devices, microelectronic circuits are using lower and lower voltage. 5 V and 12 V are no longer dominant power supplies used in microelectronic circuits. 3.3V, 2.5V, 2V, 1.8V, 1.5V, and even 1.2V are becoming standard voltage in many electronic devices. Actually, some next-generation high-speed microprocessors and DSPs need sub 1V as their supply voltage.

Migration to lower supply voltage and size miniaturization is rapidly changing power supply design and packaging technologies. The high switching frequencies together with soft switching and the synchronous rectification technologies help to reduce the losses and size of the power supplies dramatically.

On the other hand, as the power semiconductors and signal semiconductor devices are getting smaller and smaller, the size reduction of the power magnetic devices, which play critical roles in power supplies, becomes more and more crucial. The use of planar magnetics helps to minimize the profile or height of the power supplies. Moreover, the planar magnetic devices increase component reliability, reproducibility, and power density while minimizing the transformer leakage inductance. Planar magnetic devices are gaining more and more popularity in modern power supply design.

To achieve higher power, the resistance of the power magnetic device must be reduced, typically by either increasing the cross-section area of the electrical member forming the magnetic device windings, or by simply reducing the electrical path length of the device. In some cases, multiple windings or layers are connected in parallel to reduce the resistance.

Figure 1:
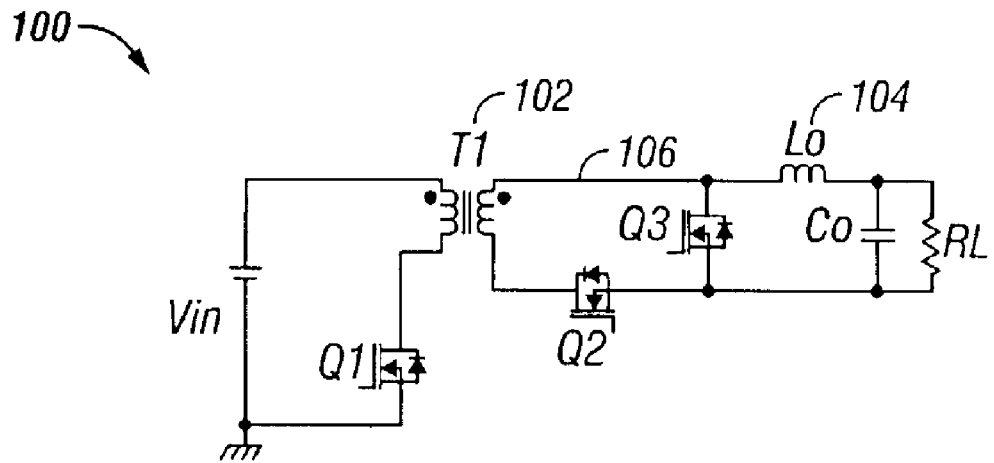
Figure 2:
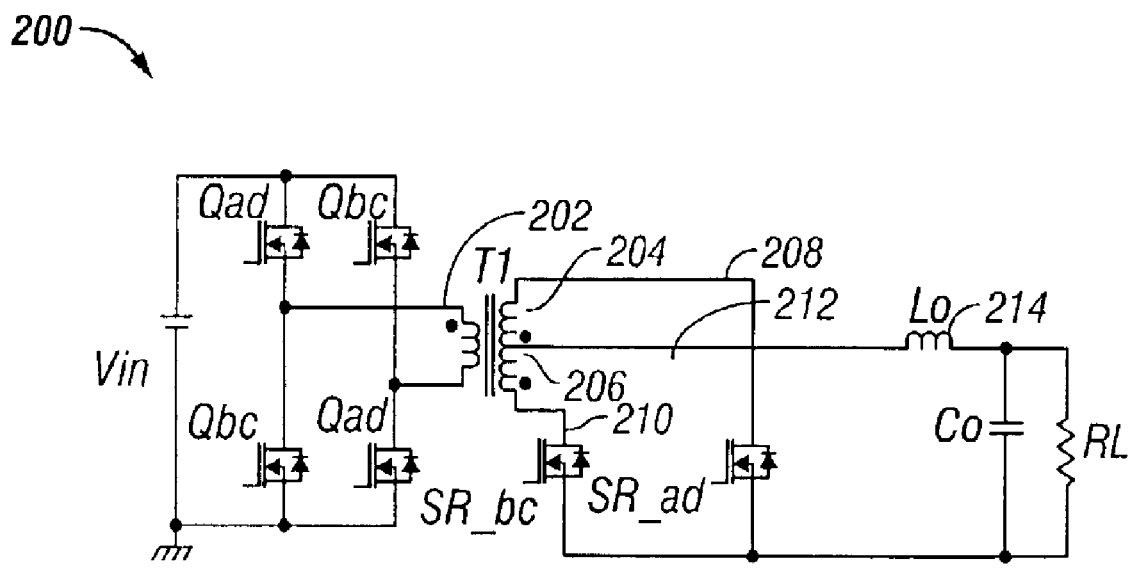

As can be seen from FIGS. 1 and 2, there are two types of isolated power supply power structures, single ended 100 and double ended 200. In either case, there are two pieces of major power magnetic devices in most of isolated power supply 100 designs. Traditionally, two discrete surface mountable planar magnetic devices are used to realize the transformer 102 and the output filter inductor 104. Both of these power magnetic devices are mounted on an Insulated Metal Substrate (IMS) connected by the electric conductive copper trace(s) 106. For the double-ended power supply 200, there are additional traces 208, 210, 212 between the transformers 204, 206 and the inductor 214.

Having a separate transformer and inductor creates several disadvantages. First, it requires a longer electrical path for the termination and electrical connection. As shown, the connection goes from the transformer lead to the board, the conductive path on the board, and then from the board to the inductor lead. This requires additional material and thus increases cost. Further, this conductive path creates additional resistance. As resistance increases, so does the $I^2R$ power loss. The traditional conductive path also increases the complexity of co-planarity requirement of the magnetic devices terminations, requiring more connecting pins and/or headers. The traditional conductive path also takes more space. These shortcomings of the two discrete parts approach limit the power density of the power supplies using the planar magnetic devices. Therefore, what is needed in the art is a new method to integrate or combine the main planar power transformer and the output filter inductor.

Others have attempted to integrate the transformer and inductor. For example, U.S. Pat. No. 4,689,592 to Walker discloses a combined transformer and inductor. Walker discloses a single electromagnetic structure comprising a pair of assembled oppositely positioned pot cores with a flat magnetically permeable washer-like member inserted in the window area between the primary windings and secondary windings to form a combined transformer and the inductor. Unfortunately, the Walker approach creates several of its own problems. First, it increases the height and size of the single structure transformer core height. Next, it reduces the magnetizing inductance of the transformer due to a lower permeability gap introduced between the two core halves. The higher required inductance (i.e. the thicker magnetic short required), the lower the magnetizing inductance. Also, the number of primary winding turns required must be increased to compensate the reduced magnetizing inductance. This results in more $I^2R$ power loss. Further, the Walker technique makes the multi-layer planar winding board very difficult to manufacture due to the magnetic short between windings. Walker's technique also reduces window area for the winding structure due to the extra piece of the magnetic material. This results in more resistance for the windings and more power losses. Increased winding losses are also caused by fringing flux at the air gaps. Finally, the Walker technique makes the interleaving winding scheme to reduce the proximity effect more difficult.

Finally, there are examples of "open frame" power converters that rely upon a single board technique to create the complete converter including two or more magnetic devices. Examples include the Innoveta iQB series and the Synqor PowerQor series. In these converters, a single multilayer PWB forms the "mother board", which contains windings for magnetic devices, conductive paths for the power train, and conductive paths to connect the control circuits together and to the power train. However, this technique requires a large, expensive multilayer PWB. The heat generated in the multilayer power windings is delivered to temperature sensitive control circuit components. Also, insertion of the cores around the mother board consumes valuable layout area on both sides of the PWB, which can result in a larger package size. Also, magnetic properties are difficult to test; the magnetic devices are an integral part of the converter product. Defects in the PWB windings can result in expensive scrap of the entire converter. Any changes on the transformer turns ratio due to the output voltage requirement require the multi-layer PWB to be modified, which results in high cost and high PWB inventory for same platform power supplies with different output voltages.

SUMMARY OF THE INVENTION

This invention centers on integrating the windings of multiple magnetic devices, not integrating the cores. By connecting the transformer secondary winding directly to the output inductor winding without using any intermediate headers and/or termination pins and/or PWB or IMS conductive copper traces, both electrical path (hence the DC resistance) and the termination resistance will be minimized. Moreover, the required expensive IMS or PWB board space can be reduced. Furthermore, the number of headers or termination pins required will also be reduced, which helps to not only alleviate the issue associated with co-planarity of the termination pins, but also reduce the cost of the material and manufacturing.

The magnetic device consists of a planar winding board, which contains the windings for both the inductor and the transformer. This winding board may be fabricated using well-known circuit lamination techniques. The insulation between the layers may be provided through a variety of dielectric materials, including but not limited to FR4 or polyimide. The windings are designed to encircle the core members, which are commonly inserted through apertures in the planar winding board. As is well-known in the art, multiple layers may be connected through vias in series or parallel in order to create the proper number of turns, control noise in the structure, or lower impedance of a given winding. The planar winding enables a high efficiency, low profile device to be formed.

The planar winding board is completed by assembling cores through apertures in the winding board, in order to impart the desired magnetic properties to the magnetic device. The cores may be fastened around the PWB with adhesives, clips, or other methods known by those skilled in magnetic device assembly. Terminals are provided to attach the magnetic device to a power circuit. These terminals may include pins, mounting lugs, connectors, header-captured terminals, edge plating, or other termination techniques. The terminals may be designed to accommodate a surface mount connection, through-hole connection, or other termination type. A header may be provided on the terminals to provide improved manufacturability or coplanarity.

Once the device is complete, it can be tested through the terminals to verify important magnetic properties such as inductor inductance, transformer magnetizing or leakage inductance, inter-winding coupling capacitance, and winding resistance. Then, a fully tested device may be assembled into the power circuit. The compact size and flat surfaces of the exemplary embodiment can provide compatibility with automated pick- and place techniques for low assembly cost. Thus, the invention offers low loss, low cost and high power density.

The present invention provides numerous advantages over the prior art. Specifically, there are no extra magnetic material inserted between windings, and thus no extra fringing flux losses. Also, it uses two separate cores, one set with no air gap for the transformer, and one set with an air gap in the center leg for inductor. A single planar PWB winding board is used without increasing complexity. There is no increase on magnetic core profile (height). Also, there is no reduction on the magnetizing inductance of the transformer. Likewise, there is no reduction on the window area and no reduction on the winding cross-section. It minimizes dc resistance and termination losses. It minimizes proximity effect (low AC resistance). It saves space and material. The design is manufacturing friendly because of its simple core and winding structure. Compared with single board converter approaches, the present invention only requires the expensive multilayer PWB for the size of the magnetic device, where the extra layers are used for the magnetic winding. The heat generated in the multilayer power windings is managed and controlled more easily. The area on the converter mother board can be used for additional components. Finally, the magnetic device may be pretested before installation in a circuit.

BRIEF DECRIPTION OF THE DRAWINGS

Figure 3A:
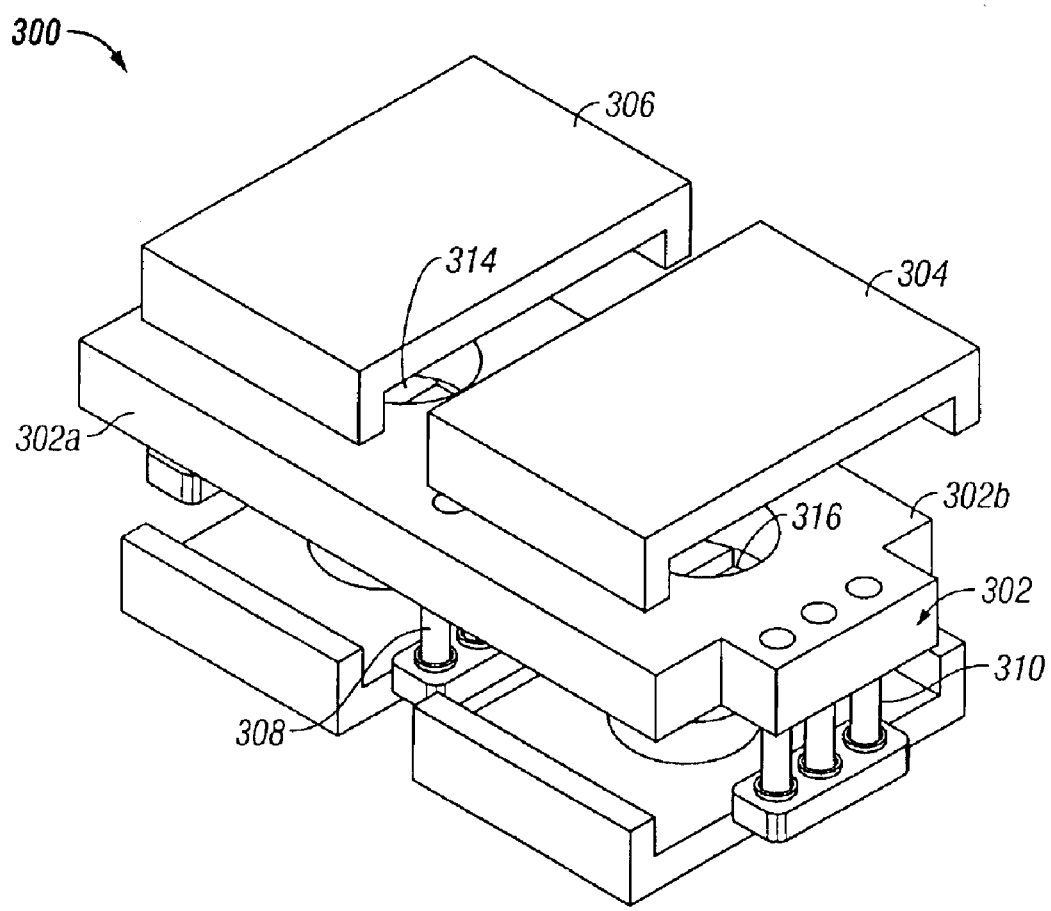
Figure 3B:
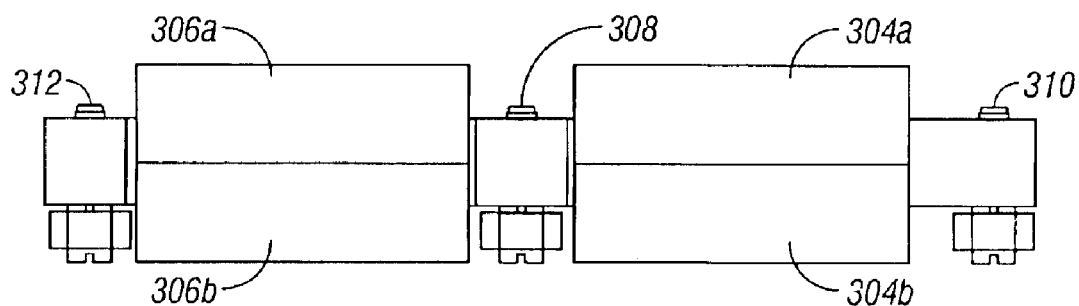
Figure 4A:
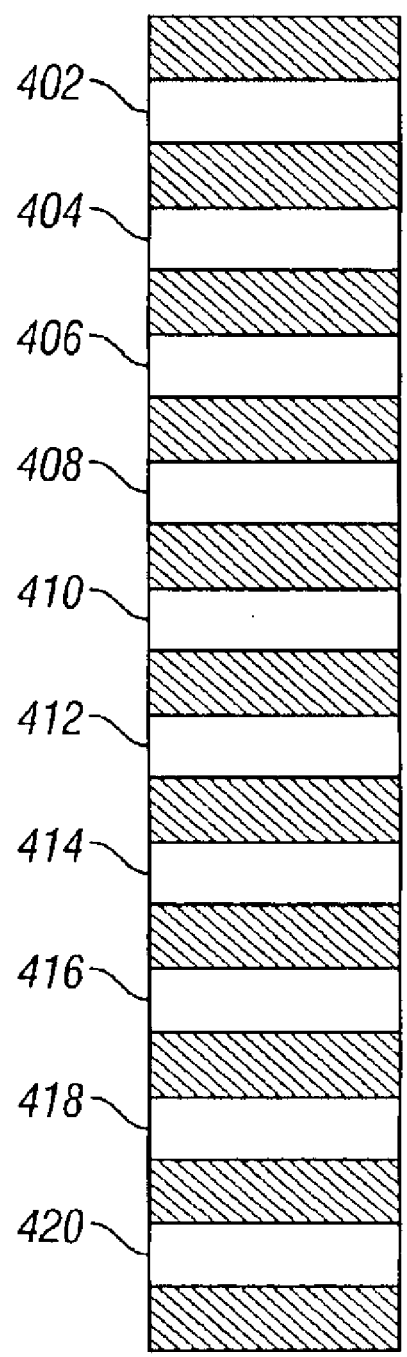
Figure 4B:
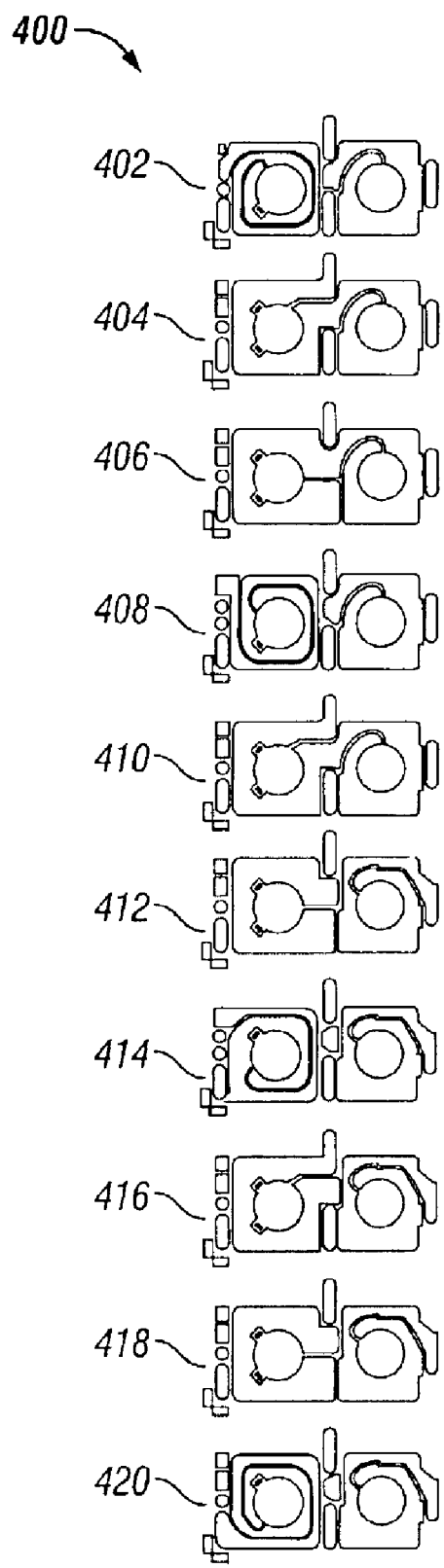

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1 and 2 are schematic diagrams of prior art DC-to-DC converters;

FIGS. 3a and 3b provide several views of the present invention showing an integrated planar device that acts as both the transformer and the inductor; and FIGS. 4a and 4b provide a sectional view of the planar element.

DETAILED DESCRIPTION OF THE DRAWINGS

An example of the present invention is illustrated in FIGS. 3a and 3b. The magnetic device 300 combines a transformer winding 302a and an output inductor winding 302b with a single planar winding board 302. Two magnetic cores are located in openings 314, 316. Headers 308, 310, 312 are used to couple the transformer and inductor to outside circuitry. As discussed below, each header has several pins. These pins can contact various winding layers within the planar winding board 302.

FIGS. 4a and 4b provide a layer-by-layer view of an exemplary planar winding board 302 for a double-ended DC—DC converter. The windings are for both the inductor and the transformer. This winding board may be fabricated using well-known circuit lamination techniques. The insulation between the layers may be provided through a variety of dielectric materials, including but not limited to FR4 or polyimide. The windings are designed to encircle the core members, which are commonly inserted through apertures in the planar winding board. As is well-known in the art, multiple layers may be connected through vias in series or parallel in order to create the proper number of turns, control noise in the structure, or lower impedance of a given winding.

In the illustrated winding pattern 400, there are 10 conductive layers separated by eleven insulating layers. The first, fourth, seventh, and tenth layers 402, 408, 414, and 420 are connected in series to form the primary winding of the transformer. Layers two, five and eight 404, 410, 416 are coupled in parallel to form the first secondary winding. Layers three, six, and nine 406, 412, 418 are coupled in parallel to form the second secondary winding: The winding pattern on the left half of each layer is used for the transformer. The winding pattern on the right half of each layer is used for the inductor. In this instance, the layers one, two, three, four, and five are in parallel and act as one turn, while layers six, seven, eight, nine, and ten are in parallel and act as a second turn.

The winding patterns for the inductor and the transformer can be placed on adjacent layers or non-adjacent layers. Further, the layers are substantially parallel.

Magnetic cores can be inserted into openings 430, 440. Once the device is complete, it can be tested through the terminals to verify important magnetic properties such as inductor inductance, transformer magnetizing or leakage inductance, inter-winding coupling capacitance, and winding resistance. Then, a fully tested device may be assembled into the power circuit.

Those skilled in the art should understand that the previously described embodiments are submitted for illustrative purposes only and other embodiments thereof are well within the scope and spirit of the present invention. Although the present invention has been described in detail, those skilled in the art should understand that they can make various changes, substitutions and alterations herein without departing from the spirit and scope of the invention in its broadest for.

We claim:

1. A magnetic device comprising:
   (a) at least one substantially planar conductive layer;
   (b) one transformer winding on that layer;
   (c) one inductor winding on that layer; and
   (d) a terminal to interconnect the magnetic device to an electrical circuits, wherein the terminal is positioned substantially between the transformer winding and the inductor winding.

2. The magnetic device of claim 1 wherein the one transformer winding is separated from a second transformer winding by an insulating layer.

3. The magnetic device of claim 1 wherein the one transformer layer is part of a single ended DC—DC converter.

4. The magnetic device of claim 1 wherein the one transformer layer is part of a double-ended DC—DC converter.

5. The magnetic device of claim 1 wherein the transformer and inductor windings are located on adjacent layers of the planar conductive layer.

6. The magnetic device of claim 1 wherein the transformer and inductor windings are located on alternative layers.

7. The magnetic device of claim 1 further comprises:
   (d) one transformer core proximate the transformer winding; and
   (e) one inductor core proximate the inductor winding.

8. The magnetic device of claim 7 wherein the planar conductive layer further comprises a second set of windings for an inductor.

9. The magnetic device of claim 8 wherein the second set of windings are selectively coupled to each other.

10. A magnetic device comprising:
    (a) a planar conductive layer configured to accept a transformer core at a first location on the planar conductive layer and an inductor core at a second location on the planar conductive layer, wherein the planar conductive layer comprises a plurality of winding layers, each winding layer separated by an insulating layer; and
    (b) at least one header for selectively coupling at least one of the winding layers to an external circuit, wherein the at least one header is positioned substantially between the first location and the second location.

11. The magnetic device of claim 10 wherein the planar conductive layer further comprises a first set of windings for a transformer.

12. The magnetic device of claim 11 wherein the first set of windings are selectively coupled to each other.

13. The magnetic device of claim 10 wherein the plurality of winding layers are substantially parallel.

14. The magnetic device of claim 10 further comprises:
    (c) one transformer core proximate the transformer winding; and
    (d) one inductor core proximate the inductor winding.

15. The magnetic device of claim 10 wherein the transformer and inductor windings are located on adjacent layers of the planar conductive layer.

16. The magnetic device of claim 10 wherein the transformer and inductor windings are located on alternative layers.

17. A method of fabricating a magnetic device comprising the steps of:
    (a) fabricating a single planar conductive layer with windings for both an inductor and a transformer; and
    (b) placing a first and second magnetic cores into core accepting areas such that the first and second magnetic cores are aligned alone a common axis in a plane corresponding to the planar conductive layer.

18. The method of claim 17 further comprising the steps of:
    (c) layering the windings on substantially parallel layers.

19. The method of claim 17 wherein step (c) further comprises layering the inductor windings on non-adjacent layers.

20. The method of claim 17 wherein step (c) further comprises layering the transformer windings on non-adjacent layers.

* * * * *

UNITED STATES PATENT AND TRADEMARK OFFICE
CERTIFICATE OF CORRECTION

PATENT NO. : 6,927,661 B2
APPLICATION NO. : 10/428963
DATED : August 9, 2005
INVENTOR(S) : Jim He et al.

It is certified that error appears in the above-identified patent and that said Letters Patent is hereby corrected as shown below:

Column 5, line 14, correct "broadest [for]" to read --broadest --form----

Column 5, line 22, correct "electrical circuit[s]," to read --electrical --circuit--,--

Column 6, line 36, correct "cores are aligned [alone] a common axis" to read --cores are aligned --along-- a common axis--

Signed and Sealed this

Fourteenth Day of November, 2006

JON W. DUDAS
*Director of the United States Patent and Trademark Office*